US012776133B2

(12) United States Patent
Chen et al.

(10) Patent No.: US 12,776,133 B2
(45) Date of Patent: Oct. 27, 2026

(54) METHOD AND APPARATUS FOR RECOGNIZING VEHICLE LANE CHANGE TREND

(71) Applicant: Yinwang Intelligent Technologies Co., Ltd., Shenzhen (CN)

(72) Inventors: Hao Chen, Shenzhen (CN); Hao Lu, Shenzhen (CN); Chen Gao, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 508 days.

(21) Appl. No.: 18/065,510

(22) Filed: Dec. 13, 2022

(65) Prior Publication Data

US 2023/0110730 A1 Apr. 13, 2023

Related U.S. Application Data

(63) Continuation of application No. PCT/CN2020/096415, filed on Jun. 16, 2020.

(51) Int. Cl.

*G06V 10/80* (2022.01)
*G01S 17/89* (2020.01)

(Continued)

(52) U.S. Cl.

CPC .............. *G06V 10/803* (2022.01); *G06T 7/60* (2013.01); *G06T 7/70* (2017.01); *G06V 20/58* (2022.01);

(Continued)

(58) Field of Classification Search

CPC .. G06V 10/803; G06V 20/58; G06V 2201/08; G06V 20/588; G06V 20/584;

(Continued)

(56) References Cited

U.S. PATENT DOCUMENTS 5,817,623 A * 10/1998 Ishii ........................ A61K 38/28 514/6.9
8,355,539 B2 * 1/2013 Tan ........................ G01S 13/931 382/104

(Continued)

FOREIGN PATENT DOCUMENTS

CN 100492437 C 5/2009
CN 106647776 A 5/2017

(Continued)

OTHER PUBLICATIONS

Remmen et al., "Cut-in Scenario Prediction for Automated Vehicles," Proceedings of 2018 IEEE International Conference on Vehicular Electronics and Safety (ICVES), Sep. 12-14, 2018, 7 pages.

(Continued)

*Primary Examiner* — Molly Wilburn
*Assistant Examiner* — Jordan McKenzie Elliott
(74) *Attorney, Agent, or Firm* — Fish & Richardson P.C.

(57) ABSTRACT

Example methods and apparatus for recognizing a vehicle lane change trend are described. One example method includes obtaining laser point cloud data of a detected target vehicle. A first distance relationship value between a center line of a lane in which the current vehicle is located and the target vehicle is obtained based on the laser point cloud data. A second distance relationship value between the center line of the lane and the target vehicle is obtained. First confidence of the first distance relationship values and second confidence of the second distance relationship values are calculated, and fusion distance relationship values are then calculated based on the first confidence and the second confidence. It is determined whether the target vehicle has a lane change trend based on the fusion distance relationship values.

20 Claims, 5 Drawing Sheets

(51) Int. Cl.
*G06T 7/60* (2017.01)
*G06T 7/70* (2017.01)
*G06V 20/58* (2022.01)

(52) U.S. Cl.
CPC ..... *G01S 17/89* (2013.01); *G06T 2207/10028* (2013.01); *G06T 2207/30256* (2013.01); *G06V 2201/08* (2022.01)

(58) Field of Classification Search
CPC ... G06T 7/60; G06T 7/70; G06T 2207/10028; G06T 2207/30256; G01S 17/89; G01S 7/4808; G01S 17/931; G08G 1/166; G08G 1/167
See application file for complete search history.

(56) References Cited

U.S. PATENT DOCUMENTS

| | | | | |
|---|---|---|---|---|
| 8,504,233 | B1 * | 8/2013 | Ferguson | B60W 30/12 340/463 |
| 11,308,337 | B2 * | 4/2022 | Horinaga | H04N 7/183 |
| 2002/0091479 | A1 * | 7/2002 | Maruko | B60T 7/22 701/96 |
| 2009/0067675 | A1 * | 3/2009 | Tan | G01S 13/931 382/104 |
| 2017/0113696 | A1 * | 4/2017 | Oh | B60W 30/18163 |
| 2019/0080609 | A1 * | 3/2019 | Mizoguchi | B60W 50/10 |
| 2021/0089791 | A1 * | 3/2021 | Sithiravel | G01S 7/4802 |
| 2021/0117698 | A1 * | 4/2021 | Horinaga | H04N 7/18 |
| 2021/0304491 | A1 * | 9/2021 | Caccin | G01C 21/32 |
| 2022/0398920 | A1 * | 12/2022 | Lu | G08G 1/0125 |
| 2023/0166763 | A1 * | 6/2023 | Goto | B60W 40/076 701/23 |

FOREIGN PATENT DOCUMENTS

| | | | | | |
|---|---|---|---|---|---|
| CN | 108961799 | A | | 12/2018 | |
| CN | 111145574 | A | * | 5/2020 | G08G 1/167 |
| EP | 2942765 | A1 | * | 11/2015 | B62D 15/0255 |

OTHER PUBLICATIONS

International Search Report and Written Opinion in International Appln. No. PCT/CN2020/096415, mailed on Mar. 10, 2021, 21 pages (with English translation).

* cited by examiner

METHOD AND APPARATUS FOR RECOGNIZING VEHICLE LANE CHANGE TREND

CROSS-REFERENCE TO RELATED APPLICATIONS

This application is a continuation of International Application No. PCT/CN2020/096415, filed on Jun. 16, 2020, the disclosure of which is hereby incorporated by reference in its entirety.

TECHNICAL FIELD

This application relates to the field of self-driving technologies, furthermore, to a method and an apparatus for recognizing a vehicle lane change trend.

BACKGROUND

At present, traffic accidents caused by vehicle lane changes are very common in urban roads. Therefore, for self-driving, it is also very important to accurately recognize a lane change trend of a vehicle around a current vehicle.

In some self-driving vehicles, when a lane change trend of a surrounding target vehicle is determined, a laser radar technology is usually used to obtain laser point cloud data of a surrounding scene, detect a contour vertex of the target vehicle, and obtain a transverse distance between the contour vertex and the current vehicle. Further, the lane change trend of the target vehicle is determined based on a change of the transverse distance with time.

In addition, in some self-driving vehicles, when a lane change trend of a surrounding target vehicle is determined, a machine vision technology is used to obtain a surrounding scene image, detect a lane line in which the current vehicle is located and the target vehicle in the scene image, and obtain a distance between the target vehicle and the lane line in which the current vehicle is located. Further, the lane change trend of the target vehicle is determined based on a change of the distance with time.

In a process of implementing this application, the inventor finds that the related technology has at least the following problems:

When the lane change trend of the target vehicle is recognized by using the laser radar technology, contour vertex detection of the target vehicle is inaccurate due to exhaust gas of the target vehicle, dust, and the like. As a result, the lane change trend of the target vehicle is inaccurately determined. When the lane change trend of the target vehicle is recognized by using the machine vision technology, there may be no lane line in an intersection area. Consequently, the lane change trend of the target vehicle cannot be recognized.

SUMMARY

Embodiments of this application provide a method and an apparatus for recognizing a vehicle lane change trend, to resolve a problem in a related technology that a vehicle lane change trend cannot be accurately recognized by using only a laser radar technology or a machine vision technology. Technical solutions are as follows:

According to a first aspect, a method for recognizing a vehicle lane change trend is provided, where the method includes:

obtaining laser point cloud data of a detected target vehicle, where the target vehicle is a vehicle traveling in a scene around the current vehicle; obtaining, based on the laser point cloud data, a first distance relationship value between a center line of a lane in which the current vehicle is located and the target vehicle; obtaining a scene image including the target vehicle; obtaining, based on the scene image, a second distance relationship value between the center line of the lane in which the current vehicle is located and the target vehicle; calculating first confidence of a plurality of obtained first distance relationship values and second confidence of a plurality of obtained second distance relationship values; calculating a plurality of fusion distance relationship values of the plurality of first distance relationship values and the plurality of second distance relationship values based on the first confidence and the second confidence; and determining, based on the plurality of fusion distance relationship values, whether the target vehicle has a lane change trend.

In the solution shown in this embodiment of this application, the current vehicle may collect the laser point cloud data of the surrounding scene by using a laser radar, and obtain, based on the laser point cloud data, the first distance relationship value between the center line of the lane in which the current vehicle is located and the target vehicle. Alternatively, the scene image of the surrounding scene may be collected by using a machine vision device such as a camera, and the second distance relationship value between the center line of the lane in which the current vehicle is located and the target vehicle is obtained based on the scene image. Herein, the distance relationship value may be a value used to reflect a distance relationship between the target vehicle and the center line of the lane in which the current vehicle is located, for example, a ratio of a distance to a lane width.

Then, for the plurality of obtained first distance relationship values and the plurality of second distance relationship values, the confidence of the plurality of first distance relationship values and the confidence of the plurality of second distance relationship values may be calculated, and the plurality of first distance relationship values and the plurality of second distance relationship values are fused based on the confidence obtained through calculation, to obtain the plurality of fusion distance relationship values. Finally, the lane change trend of the target vehicle is determined based on a time-varying relationship of fusion distance relationship values of the plurality of detection periods.

According to the foregoing solution, the lane change trend of the target vehicle is comprehensively determined with reference to the laser point cloud data obtained by using the laser radar technology and the scene image obtained by using the machine vision technology. This can effectively avoid a problem of inaccurate recognition of the vehicle lane change trend that is caused by using only the laser radar technology or the machine vision technology.

In a possible implementation, the obtaining, based on the laser point cloud data and the center line point set, the first distance relationship value between the center line of the lane in which the current vehicle is located and the target vehicle includes:

obtaining, based on a high-definition map, a center line point set of the lane in which the current vehicle is located, where the center line point set includes coordinates of a plurality of sampling points on the center line of the lane in which the current vehicle is located in a world coordinate system; and obtaining, based on the laser point cloud data and the center line point set, the first distance relationship value between the center line of the lane in which the current vehicle is located and the target vehicle.

In the solution shown in this embodiment of this application, because the laser point cloud data does not include lane line information, to obtain the first distance relationship value between the center line of the lane in which the current vehicle is located and the target vehicle, the center line point set of the lane in which the current vehicle is located may be first obtained by using the high-definition map. The center line point set includes the coordinates of the plurality of sampling points on the center line of the lane in which the current vehicle is located in the world coordinate system. Then, the first distance relationship value between the center line of the lane in which the current vehicle is located and the target vehicle may be obtained based on the laser point cloud data of the target vehicle in the obtained laser point cloud data and the center line point set of the lane in which the current vehicle is located.

In a possible implementation, the obtaining, based on the laser point cloud data and the center line point set, the first distance relationship value between the center line of the lane in which the current vehicle is located and the target vehicle includes:

obtaining, based on the laser point cloud data, first coordinates of the target vehicle in a self-vehicle coordinate system of the current vehicle; converting the first coordinates into second coordinates of the target vehicle in the world coordinate system; using a minimum distance between the coordinates of the sampling points included in the center line point set in the world coordinate system and the second coordinates as a first distance between the center line of the lane in which the current vehicle is located and the target vehicle; and obtaining a width of the lane in which the current vehicle is located, calculating a first ratio of the first distance to the width of the lane line in which the current vehicle is located, and using the first ratio as the first distance relationship value between the center line of the lane in which the current vehicle is located and the target vehicle.

In the solution shown in this embodiment of this application, target vehicle recognition may be performed on the obtained laser point cloud data, to obtain the coordinates of the target vehicle in the laser radar coordinate system, and then the coordinates of the target vehicle in the laser radar coordinate system are converted into the first coordinates of the current vehicle in the self-vehicle coordinate system. Then, the first coordinates are converted into the second coordinates of the target vehicle in the world coordinate system, and the minimum distance between the second coordinates and the coordinates of the sampling points in the center line point set of the lane in which the current vehicle is located on the high-definition map is used as the first distance between the center line of the lane in which the current vehicle is located and the target vehicle. Herein, the coordinates of sampling points in the center line point set of the lane in which the current vehicle is located on the high-definition map are coordinates in the world coordinate system. Finally, the width of the lane in which the current vehicle is located may be obtained from the high-definition map, a first ratio of the first distance to the width of the lane line in which the current vehicle is located is calculated, and the first ratio is used as the first distance relationship value between the center line of the lane in which the current vehicle is located and the target vehicle.

In a possible implementation, the obtaining, based on the scene image, a second distance relationship value between the center line of the lane in which the current vehicle is located and the target vehicle includes:

calculating, in an image coordinate system of the scene image, a vertical distance between the target vehicle and the center line of the lane in which the current vehicle is located; calculating a width of the lane in which the current vehicle is located in the image coordinate system of the scene image; and calculating a second ratio of the width of the lane in which the current vehicle is located in the image coordinate system of the scene image to the vertical distance, and using the second ratio as the second distance relationship value between the center line of the lane in which the current vehicle is located and the target vehicle.

In the solution shown in this embodiment of this application, lane line recognition and target vehicle recognition may be performed on the scene image. During target vehicle recognition, a bounding box (bounding box) corresponding to the target vehicle may be generated, and coordinates of two vertices that are in the bounding box of the target vehicle and that are close to the current vehicle and in contact with the ground are obtained in the image coordinate system. Vertical distances between the two vertices and the center line of the lane in which the current vehicle is located are separately calculated. Widths, in the image coordinate system, that are of the lane in which the current vehicle is located and that respectively corresponds to the two vertices are separately calculated. Distance relationship values between the two vertices and the center line of the lane in which the current vehicle is located are further separately calculated. A smaller calculated value is used as the second distance relationship value between the target vehicle and the center line of the lane in which the current vehicle is located.

In a possible implementation, the calculating first confidence of a plurality of obtained first distance relationship values and second confidence of a plurality of obtained second distance relationship values includes:

calculating, based on an ideal lane change model and an ideal lane keep model, the first confidence of the plurality of obtained first distance relationship values and the second confidence of the plurality of obtained second distance relationship values.

In the solution shown in this embodiment of this application, the ideal lane change model is used to represent a time-varying relationship of a distance relationship value between another vehicle in the scene around the current vehicle and the center line of the lane in which the current vehicle is located when the another vehicle changes a lane. The ideal lane keep model is used to represent a time-varying relationship of a distance relationship value between the another vehicle and the center line of the lane in which the current vehicle is located when the another vehicle moves along the lane. The confidence of the first distance relationship value may be obtained based on the time-varying relationship of the plurality of first distance relationship values and a fitting status between the ideal lane change model and the ideal lane keep model. Similarly, the confidence of the second distance relationship value may be obtained.

In a possible implementation, the calculating, based on an ideal lane change model and an ideal lane keep model, the first confidence of the plurality of obtained first distance relationship values and the second confidence of the plurality of obtained second distance relationship values includes:

calculating a value of each unknown parameter in the ideal lane change model based on the plurality of obtained first distance relationship values, to obtain a first available lane change model; calculating a value of each unknown parameter in the ideal lane keep model based on the plurality of obtained first distance relationship values, to obtain a first available lane keep model; calculating a first fitting degree of the plurality of obtained first distance relationship values to the first available lane change model and a second fitting degree of the plurality of obtained first distance relationship values to the first available lane keep model; obtaining the first confidence of the plurality of obtained first distance relationship values based on the first fitting degree and the second fitting degree; calculating a value of each unknown parameter in the ideal lane change model based on the plurality of obtained second distance relationship values, to obtain a second available lane change model; calculating a value of each unknown parameter in the ideal lane keep model based on the plurality of obtained second distance relationship values, to obtain a second available lane keep model; calculating a third fitting degree of the plurality of obtained second distance relationship values to the second available lane change model and a fourth fitting degree of the plurality of obtained second distance relationship values to the second available lane keep model; and obtaining the second confidence of the plurality of obtained second distance relationship values based on the third fitting degree and the fourth fitting degree.

In the solution shown in this embodiment of this application, a K-L divergence between the plurality of obtained first distance relationship values and the ideal lane change model may be calculated, and a value of each unknown parameter in the ideal lane change model is adjusted. When the K-L divergence is the smallest, the first available lane change model is obtained. A K-L divergence between the plurality of obtained first distance relationship values and the ideal lane keep model is calculated, and a value of each unknown parameter in the ideal lane change model is adjusted. When the K-L divergence is the smallest, the first available lane model is obtained. Then, the first fitting degree of the plurality of obtained first distance relationship values to the first available lane change model and the second fitting degree of the plurality of obtained first distance relationship values to the first available lane keep model may be separately calculated. When at least one of the first fitting degree and the second fitting degree is relatively large, it indicates that reliability of the plurality of obtained first distance relationship values is relatively high.

Similarly, the third fitting degree of the plurality of obtained second distance relationship values to the second available lane change model and the fourth fitting degree of the plurality of obtained second distance relationship values to the second available lane keep model may be obtained. When at least one of the third fitting degree and the fourth fitting degree is relatively large, it indicates that reliability of the plurality of obtained second distance relationship values is relatively high.

In a possible implementation, the obtaining the first confidence of the plurality of obtained first distance relationship values based on the first fitting degree and the second fitting degree includes:

determining a reciprocal of a smaller value between the first fitting degree and the second fitting degree as the first confidence of the plurality of obtained first distance relationship values.

The obtaining the second confidence of the plurality of obtained second distance relationship values based on the third fitting degree and the fourth fitting degree includes:

determining a reciprocal of a smaller value between the third fitting degree and the fourth fitting degree as the second confidence of the plurality of obtained second distance relationship values.

In a possible implementation, the obtaining, based on the laser point cloud data, a first distance relationship value between a center line of a lane in which the current vehicle is located and the target vehicle includes:

obtaining, based on a detection period and the laser point cloud data, the first distance relationship value between the center line of the lane in which the current vehicle is located and the target vehicle.

The obtaining, based on the scene image, a second distance relationship value between the center line of the lane in which the current vehicle is located and the target vehicle includes:

obtaining, based on the detection period and the scene image, the second distance relationship value between the center line of the lane in which the current vehicle is located and the target vehicle.

The calculating a plurality of fusion distance relationship values of the plurality of first distance relationship values and the plurality of second distance relationship values based on the first confidence and the second confidence includes:

calculating, based on the first confidence and the second confidence, a first weight corresponding to the plurality of first distance relationship values and a second weight corresponding to the plurality of second distance relationship values; obtaining, from the plurality of first distance relationship values and the plurality of second distance relationship values, a target first distance relationship value and a target second distance relationship value that are obtained in a same detection period; and adding a product of the target first distance relationship value and the first weight to a product of the target second distance relationship value and the second weight, to obtain a fusion distance relationship value corresponding to the detection period to which the target first distance relationship value and the target second relationship value belong.

In the solution shown in this embodiment of this application, the first distance relationship value and the second distance relationship value may be obtained based on a same detection period. When the fusion distance relationship value is calculated, the first distance relationship value and the second distance relationship value that are obtained in each of the plurality of detection periods may be separately calculated. In other words, for each of the plurality of obtained detection periods, a corresponding fusion distance relationship value may be calculated.

In a possible implementation, the determining, based on the plurality of fusion distance relationship values, whether the target vehicle has a lane change trend includes:

calculating a value of each unknown parameter in the ideal lane change model based on the fusion distance relationship value corresponding to each of the plurality of detection periods, to obtain a third available lane change model; calculating a fifth fitting degree of the fusion distance relationship values corresponding to the plurality of detection periods to the third available lane change model; and if the fifth fitting degree is greater than a preset fitting degree threshold, determining that the target vehicle has the lane change trend.

In the solution shown in this embodiment of this application, if the fitting degree of the fusion distance relationship values corresponding to the plurality of detection periods to the third available lane change model is greater than the preset fitting degree threshold, it may be considered that the target vehicle has the lane change trend, so as to control, in advance, the vehicle to perform processing such as deceleration on the target vehicle.

According to a second aspect, an apparatus for recognizing a vehicle lane change trend is provided, where the apparatus includes:

an obtaining module, configured to: obtain laser point cloud data of a detected target vehicle, where the target vehicle is a vehicle traveling in a scene around the current vehicle; obtain, based on the laser point cloud data, a first distance relationship value between a center line of a lane in which the current vehicle is located and the target vehicle; obtain a scene image including the target vehicle; and obtain, based on the scene image, a second distance relationship value between the center line of the lane in which the current vehicle is located and the target vehicle;

a calculation module, configured to calculate first confidence of a plurality of obtained first distance relationship values and second confidence of a plurality of obtained second distance relationship values;

a fusion module, configured to calculate a plurality of fusion distance relationship values of the plurality of first distance relationship values and the plurality of second distance relationship values based on the first confidence and the second confidence; and a determining module, configured to determine, based on the plurality of fusion distance relationship values, whether the target vehicle has a lane change trend.

In a possible implementation, the obtaining module is configured to:

obtain, based on a high-definition map, a center line point set of the lane in which the current vehicle is located, where the center line point set includes coordinates of a plurality of sampling points on the center line of the lane in which the current vehicle is located in a world coordinate system; and obtain, based on the laser point cloud data and the center line point set, the first distance relationship value between the center line of the lane in which the current vehicle is located and the target vehicle.

In a possible implementation, the obtaining module is configured to:

obtain, based on the laser point cloud data, first coordinates of the target vehicle in a self-vehicle coordinate system of the current vehicle;

convert the first coordinates into second coordinates of the target vehicle in the world coordinate system;

use a minimum distance between the coordinates of the sampling points included in the center line point set in the world coordinate system and the second coordinate as a first distance between the center line of the lane in which the current vehicle is located and the target vehicle; and obtain a width of the lane in which the current vehicle is located, calculate a first ratio of the first distance to the width of the lane line in which the current vehicle is located, and use the first ratio as the first distance relationship value between the center line of the lane in which the current vehicle is located and the target vehicle.

In a possible implementation, the obtaining module is configured to:

calculate, in an image coordinate system of the scene image, a vertical distance between the target vehicle and the center line of the lane in which the current vehicle is located;

calculate a width of the lane in which the current vehicle is located in the image coordinate system of the scene image; and calculate a second ratio of the vertical distance to the width of the lane in which the current vehicle is located in the image coordinate system of the scene image, and use the second ratio as the second distance relationship value between the center line of the lane in which the current vehicle is located and the target vehicle.

In a possible implementation, the calculation module is configured to:

calculate, based on an ideal lane change model and an ideal lane keep model, the first confidence of the plurality of obtained first distance relationship values and the second confidence of the plurality of obtained second distance relationship values, where the ideal lane change model is used to represent a time-varying relationship of a distance relationship value between another vehicle in the scene around the current vehicle and the center line of the lane in which the current vehicle is located when the another vehicle changes a lane; and the ideal lane keep model is used to represent a time-varying relationship of a distance relationship value between the another vehicle and the center line of the lane in which the current vehicle is located when the another vehicle moves along the lane.

In a possible implementation, the calculation module is configured to:

calculate a value of each unknown parameter in the ideal lane change model based on the plurality of obtained first distance relationship values, to obtain a first available lane change model;

calculate a value of each unknown parameter in the ideal lane keep model based on the plurality of obtained first distance relationship values, to obtain a first available lane keep model;

calculate a first fitting degree of the plurality of obtained first distance relationship values to the first available lane change model and a second fitting degree of the plurality of obtained first distance relationship values to the first available lane keep model;

obtain the first confidence of the plurality of obtained first distance relationship values based on the first fitting degree and the second fitting degree;

calculate a value of each unknown parameter in the ideal lane change model based on the plurality of obtained second distance relationship values, to obtain a second available lane change model;

calculate a value of each unknown parameter in the ideal lane keep model based on the plurality of obtained second distance relationship values, to obtain a second available lane keep model;

calculate a third fitting degree of the plurality of obtained second distance relationship values to the second available lane change model and a fourth fitting degree of the plurality of obtained second distance relationship values to the second available lane keep model; and obtain the second confidence of the plurality of obtained second distance relationship values based on the third fitting degree and the fourth fitting degree.

In a possible implementation, the calculation module is configured to:

determine a reciprocal of a smaller value between the first fitting degree and the second fitting degree as the first confidence of the plurality of obtained first distance relationship values.

Obtaining the second confidence of the plurality of obtained second distance relationship values based on the third fitting degree and the fourth fitting degree includes:

determining a reciprocal of a smaller value between the third fitting degree and the fourth fitting degree as the second confidence of the plurality of obtained second distance relationship values.

In a possible implementation, the obtaining module is configured to:

obtain, based on a detection period and the laser point cloud data, the first distance relationship value between the center line of the lane in which the current vehicle is located and the target vehicle; and obtain, based on the detection period and the scene image, the second distance relationship value between the center line of the lane in which the current vehicle is located and the target vehicle.

The fusion module is configured to:

calculate, based on the first confidence and the second confidence, the first weight corresponding to the plurality of first distance relationship values and the second weight corresponding to the plurality of second distance relationship values;

obtain, from the plurality of first distance relationship values and the plurality of second distance relationship values, a target first distance relationship value and a target second distance relationship value that are obtained in a same detection period; and add a product of the target first distance relationship value and the first weight to a product of the target second distance relationship value and the second weight, to obtain a fusion distance relationship value corresponding to the detection period to which the target first distance relationship value and the target second relationship value belong.

In a possible implementation, the calculation module is configured to:

calculate a value of each unknown parameter in the ideal lane change model based on a fusion distance relationship value corresponding to each of the plurality of detection periods, to obtain a third available lane change model;

calculate a fifth fitting degree of the fusion distance relationship values corresponding to the plurality of detection periods to the third available lane change model; and if the fifth fitting degree is greater than a preset fitting degree threshold, determine that the target vehicle has a lane change trend.

According to a third aspect, a device for recognizing a vehicle lane change trend is provided, where the device for recognizing the vehicle lane change trend includes a processor and a memory, the memory stores at least one instruction, and the instruction is loaded and executed by the processor to implement an operation performed by the method for recognizing the vehicle lane change trend according to the first aspect.

According to a fourth aspect, a computer-readable storage medium is provided. The storage medium stores at least one instruction, and the instruction is loaded and executed by a processor to implement operations performed by using the method for recognizing the vehicle lane change trend according to the first aspect.

According to a fifth aspect, a computer program product including instructions is provided. When the computer program product runs on a device for recognizing a vehicle lane change trend, the device for recognizing the vehicle lane change trend is enabled to perform the method for recognizing the vehicle lane change trend according to the first aspect.

The technical solutions provided in embodiments of this application have the following beneficial effects:

In the solution shown in this embodiment of this application, a first distance relationship value between a center line of a lane in which the current vehicle is located and a target vehicle is obtained based on laser point cloud data. A second distance relationship value between the center line of the lane in which the current vehicle is located and the target vehicle is obtained based on a scene image. The first distance relationship value and the second distance relationship value are fused to obtain a fusion distance relationship value. Finally, a lane change trend of the target vehicle is determined based on the fusion distance relationship value. It can be learned that in this solution, the lane change trend of the target vehicle is comprehensively determined with reference to the laser point cloud data obtained by using the laser radar technology and the scene image obtained by using the machine vision technology. This can effectively avoid a problem of inaccurate recognition of the vehicle lane change trend that is caused by using only the laser radar technology or the machine vision technology.

DESCRIPTION OF EMBODIMENTS

An embodiment of this application provides a method for recognizing a vehicle lane change trend. The method may be applied to a self-driving vehicle. The method may be implemented by a device for recognizing a vehicle lane change trend in the self-driving vehicle. A sensing system, a positioning system, and the like may be deployed in the self-driving vehicle. The sensing system may include a laser radar, a camera, and the like. The positioning system may be a global positioning system (GPS), a BeiDou system, or the like.

Figure 1:
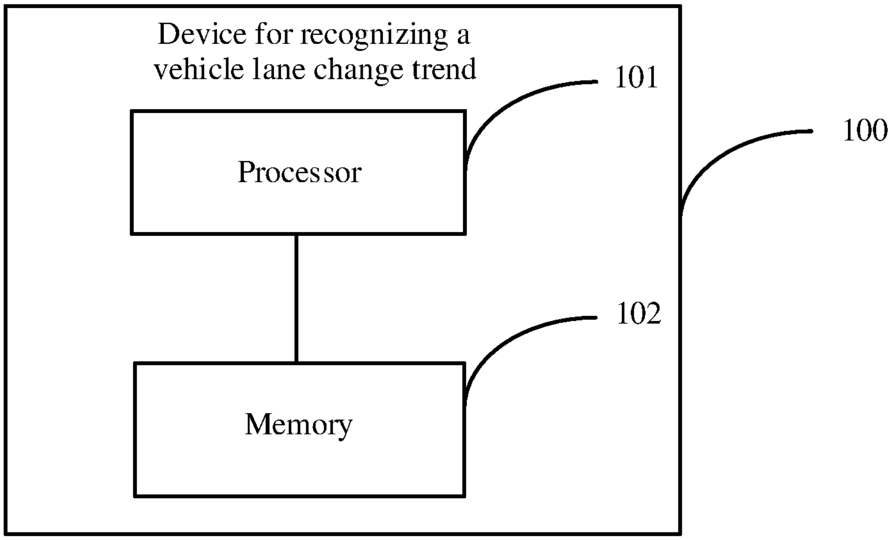
FIG. 1 is a schematic diagram of a structure of a device for recognizing a vehicle lane change trend according to an embodiment of this application.

FIG. 1 is a schematic diagram of a device 100 for recognizing a vehicle lane change trend according to an embodiment of this application. In FIG. 1, the device for recognizing a vehicle lane change trend may include a processor 101 and a memory 102. The processor 101 may be a central processing unit (CPU). The processor 101 may be one processor, or may include a plurality of processors. The memory 102 may include a volatile memory, for example, a random access memory (RAM). Alternatively, the memory may include a nonvolatile memory, for example, a read-only memory (ROM) or a flash memory. The memory may alternatively include a combination of the foregoing types of memories. The memory 102 may be one memory or may include a plurality of memories. The memory 102 stores a computer-readable instruction, and the computer-readable instruction may be executed by the processor 101, to implement the method for recognizing a vehicle lane change trend provided in the embodiments of this application.

Figure 2:
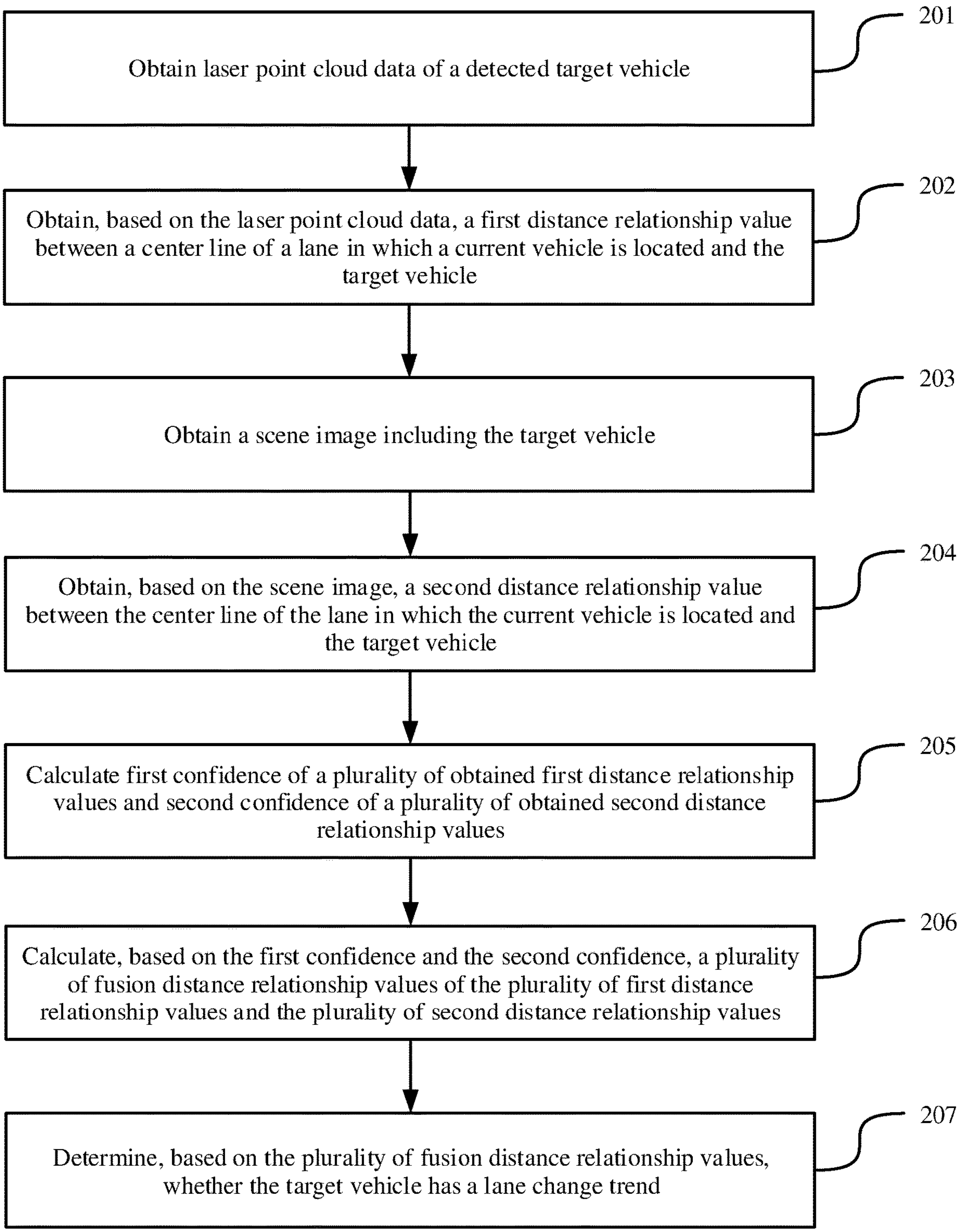
FIG. 2 is a flowchart of a method for recognizing a vehicle lane change trend according to an embodiment of this application.

FIG. 2 is a flowchart of a method for recognizing a vehicle lane change trend according to an embodiment of this application. A procedure of the method may include the following steps.

Step 201: Obtain laser point cloud data of a detected target vehicle.

The target vehicle is a vehicle traveling in a scene around a current vehicle.

In implementation, a laser radar may be installed on the current vehicle, and the laser radar scans the surrounding scene at a fixed frequency to obtain laser point cloud data. When the laser point cloud data of the detected target vehicle is obtained, the laser point cloud data of the detected target vehicle may not be obtained in each frame. Instead, the laser point cloud data of the detected target vehicle is obtained based on a detection period. In one detection period, the laser radar may collect one or more frames of laser point cloud data of the detected target vehicle. In each detection period, a last frame of laser point cloud data that is of the detected target vehicle and that is obtained in the current detection period may be obtained.

Step 202: Obtain, based on the laser point cloud data, a first distance relationship value between a center line of a lane in which the current vehicle is located and the target vehicle.

In implementation, for the obtained laser point cloud data, the target vehicle may be recognized, and coordinates of a laser point corresponding to a contour line vertex of the target vehicle in a laser radar coordinate system are obtained. Then, the coordinates of the contour line vertex of the target vehicle in the laser radar coordinate system are converted into coordinates of the contour line vertex of the target vehicle in a self-vehicle coordinate system based on a transformation matrix from the laser radar coordinate system obtained through pre-calibration to the self-vehicle coordinate system, to obtain first coordinates of the target vehicle in the self-vehicle coordinate system. The obtained coordinates of the target vehicle in the laser radar coordinate system may be the coordinates of the contour line vertex of the target vehicle in the laser radar coordinate system. Correspondingly, the converted first coordinates in the self-vehicle coordinate system may include coordinates of the contour line vertex of the target vehicle in the self-vehicle coordinate system. Herein, different shapes of the target vehicle may accordingly correspond to different quantities of contour line vertices.

Then, the first coordinates of the target vehicle in the self-vehicle coordinate system may be converted into coordinates of the target vehicle in a world coordinate system, to obtain second coordinates of the target vehicle in the world coordinate system. In other words, coordinates of each contour line vertex of the target vehicle in the self-vehicle coordinate system are converted into coordinates of the contour line vertex of the target vehicle in the world coordinate system. A method for converting the coordinates of each contour line vertex of the target vehicle from the self-vehicle coordinate system to the world coordinate system may be as follows:

Timestamp alignment is performed on the laser radar and a positioning system. Coordinates $(x_0, y_0)$ and an orientation angle $\theta_0$ of the current vehicle in the world coordinate system are obtained by using the positioning system. Then, the first coordinates of the target vehicle in the self-vehicle coordinate system are converted according to the following formula (1):

$$[x_i', y_i', 1]^T = T_v^w[x_i, y_i, 1]^T \tag{1}$$

$x_i$, $y_i$ is a horizontal coordinate and a vertical coordinate of the $i^{th}$ contour line vertex of the target vehicle in the self-vehicle coordinate system of the current vehicle, and $$x_i', y_i'$$

is a horizontal coordinate and a vertical coordinate of the $i^{th}$ contour line vertex of the target vehicle in the world coordinate system.

$$T_v^w$$

is a rotation matrix from the self-vehicle coordinate system to the world coordinate system, and the rotation matrix may be represented as follows:

$$T_v^w = \begin{bmatrix} \cos\theta_0 & -\sin\theta_0 & x_0 \\ \sin\theta_0 & \cos\theta_0 & y_0 \\ 0 & 0 & 1 \end{bmatrix}$$

After the second coordinates of the target vehicle in the world coordinate system are obtained, a center line point set of the lane in which the current vehicle is located may be obtained from a high-definition map. Herein, the obtained center line point set may be a center line point set that meets a preset distance condition from the current vehicle, for example, a center line point set of the lane in which the current vehicle is located within a range of 100 meters of the current vehicle.

Then, distances between the second coordinates of the target vehicle in the world coordinate system and coordinates of sampling points in the obtained center line point set of the lane in which the current vehicle is located on the high-definition map may be calculated, and a minimum distance is selected as the distance between the target vehicle and the center line of the lane in which the current vehicle is located. In other words, distances between the coordinates of the contour line vertices of the target vehicle in the world coordinate system and the coordinates of the sampling points in the obtained center line point set of the lane in which the current vehicle is located on the high-definition map are calculated, and a minimum distance is selected as the distance between the target vehicle and the center line of the lane in which the current vehicle is located. Herein, the distance between the target vehicle and the center line of the lane in which the current vehicle is located may be denoted as $d_1$.

Then, a ratio of the distance $d_1$ between the target vehicle and the center line of the lane in which the current vehicle is located to a width $D_1$ of the lane in which the current vehicle is located may be calculated, and the ratio is used as the first distance relationship value $\gamma_l$ between the target vehicle and the center line of the lane in which the current vehicle is located. That is, $$\gamma_l = \frac{d_1}{D_1}.$$

Herein, the width $D_1$ of the lane in which the current vehicle is located may be obtained by using the high-definition map.

In addition, it should be further noted that a distance relationship value is used to indicate a distance relationship between another vehicle and the center line of the lane in which the current vehicle is located. In addition to a ratio of a distance between the another vehicle and the center line of the lane in which the current vehicle is located to the width of the lane in which the current vehicle is located, the distance relationship value may also be represented by a reciprocal of the ratio.

Step 203: Obtain a scene image including the target vehicle.

In implementation, a machine vision device, such as a camera, may be installed on the current vehicle. The machine vision device photographs a surrounding scene at a fixed frequency to obtain the scene image. When the scene image including the target vehicle is obtained, each frame of scene image including the target vehicle may not be obtained, but the laser point cloud data including the target vehicle is obtained based on the detection period. In one detection period, the machine vision device may obtain one or more frames of scene images including the target vehicle. In a detection period, a last frame of scene image that includes the target vehicle and that is obtained in the current detection period may be obtained.

Step 204: Obtain, based on the scene image, a second distance relationship value between the center line of the lane in which the current vehicle is located and the target vehicle.

Figure 3:
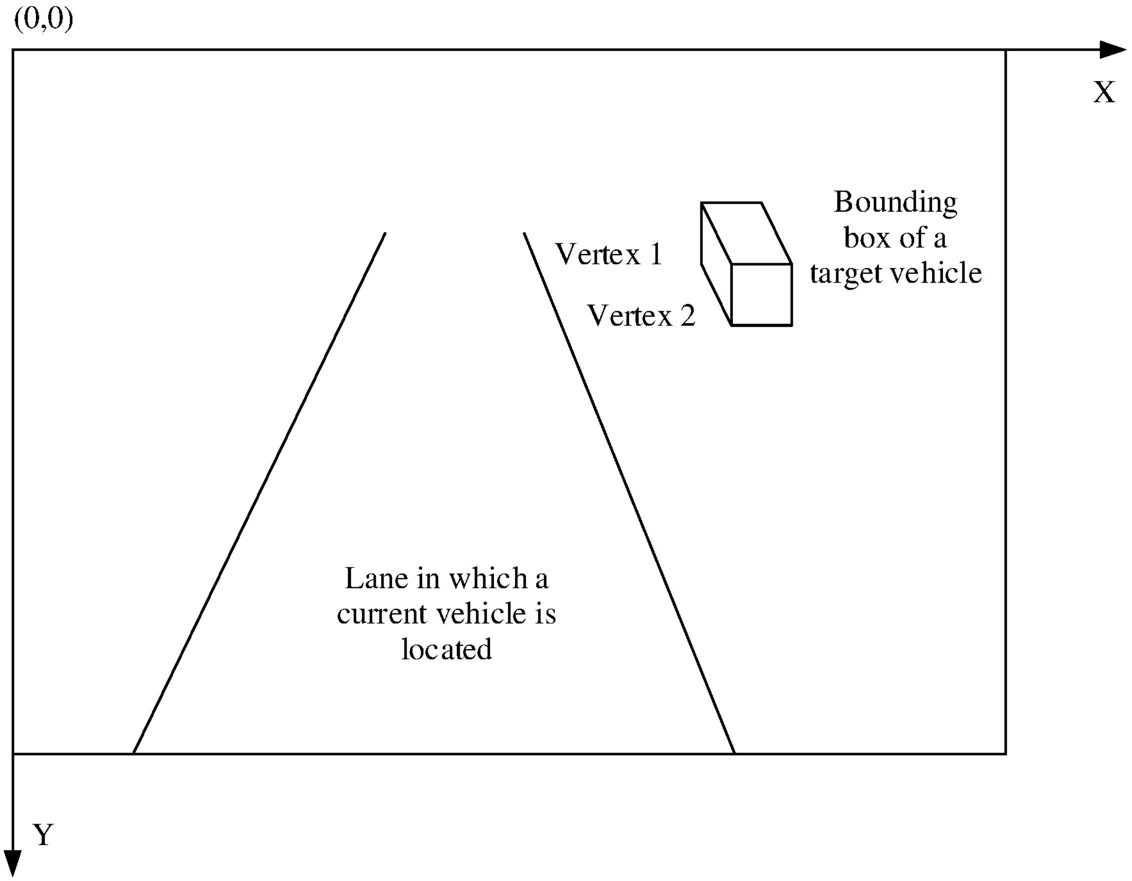
FIG. 3 is a schematic diagram of an image coordinate system of a scene image according to an embodiment of this application.

In implementation, lane line recognition and target vehicle recognition may be performed on the obtained scene image including the target vehicle. When target vehicle recognition is performed, a bounding box (bounding box) corresponding to the target vehicle may be generated, and coordinates of two vertices that are in the bounding box of the target vehicle and that are close to the current vehicle and in contact with the ground in an image coordinate system are obtained. As shown in FIG. 3, the image coordinate system may use an upper left corner of the image as an origin. Coordinates of a vertex 1 that is in the bounding box of the target vehicle and that is close to the current vehicle and in contact with the ground may be denoted as $(x_{v1}, y_{v1})$. Coordinates of a vertex 2 that is in the bounding box of the target vehicle and that is close to the current vehicle and in contact with the ground may be denoted as $(x_{v2}, y_{v2})$.

Figure 4:
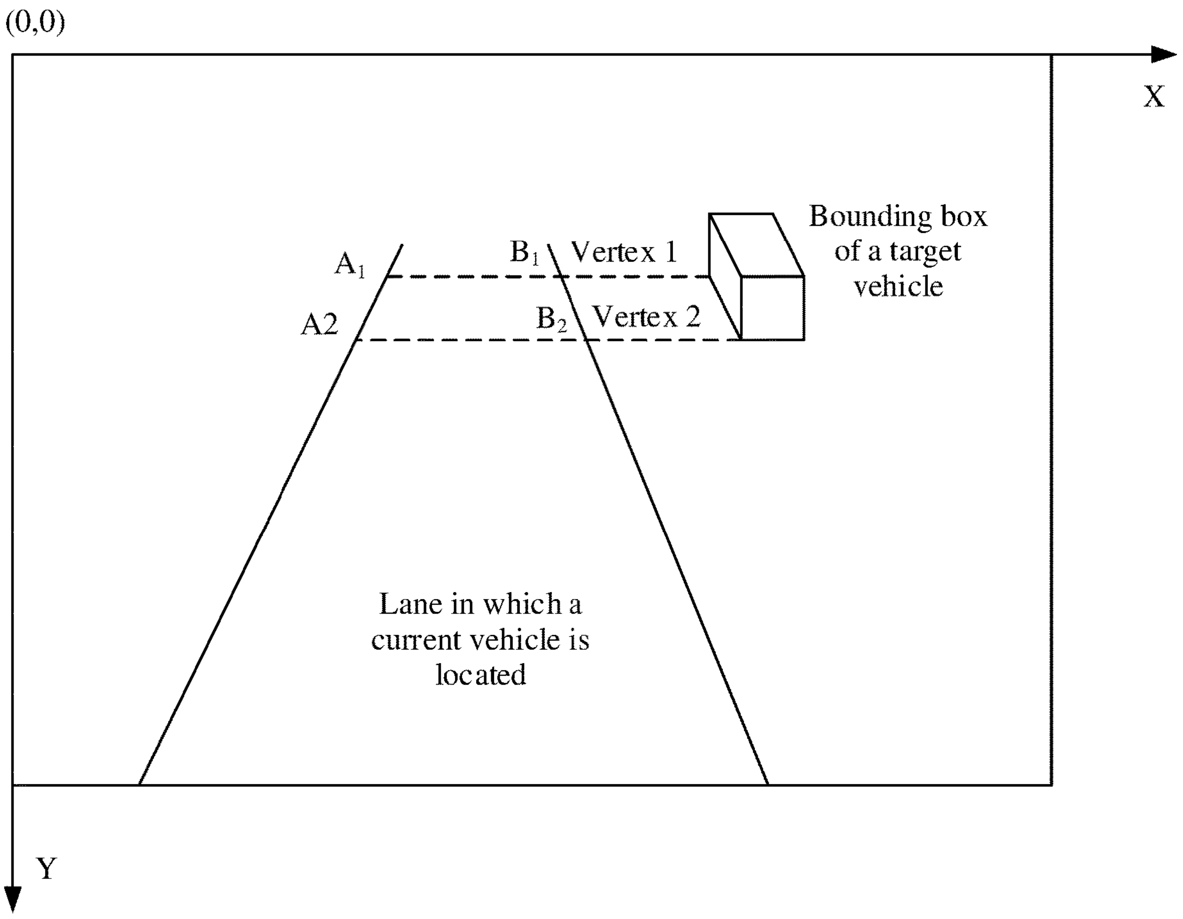
FIG. 4 is a schematic diagram of an image coordinate system of a scene image according to an embodiment of this application.

In the image coordinate system shown in FIG. 3, a point $A_1$ that is on a left lane line of the lane in which the current vehicle is located and that has a same vertical coordinate as the vertex 1 and a point $B_1$ that is on a right lane line and that has a same vertical coordinate as the vertex 1 are separately obtained. Coordinates of $A_1$ are $(x_{l1}, y_{v1})$, and coordinates of $B_1$ are $(x_{r1}, y_{v1})$. Similarly, a point $A_2$ that is on the left lane line of the lane in which the current vehicle is located and that has a same vertical coordinate as the vertex 2 and a point $B_2$ that is on the lane line and that has a same vertical coordinate as the vertex 2 are obtained. Coordinates of $A_2$ are $(x_{l2}, y_{v2})$, and coordinates of $B_2$ are $(x_{r2}, y_{v2})$. A location relationship among the vertex 1, $A_1$, $B_1$, the vertex 2, $A_2$, and $B_2$ may be shown in FIG. 4. An image coordinate system shown in FIG. 4 is the same as the image coordinate system shown in FIG. 3. For the vertex 1 and the vertex 2, distance relationship values between the corresponding vertices and the center line of the lane in which the current vehicle is located may be separately calculated, and a smaller value obtained through calculation is used as the second distance relationship value between the target vehicle and the center line of the lane in which the current vehicle is located.

A distance relationship value between the vertex 1 and the center line of the lane in which the current vehicle is located may be calculated as follows:

First, a point $C_1$ that is on the center line of the lane and that corresponds to the vertex 1 is obtained, coordinates of $C_1$ are $(x_{c1}, y_{v1})$, and $x_{c1}$ may be calculated according to the following formula (2):

$$x_{c1} = \frac{x_{r1} + x_{l1}}{2} \tag{2}$$

Then, the distance relationship value between the vertex 1 and the center line of the lane in which the current vehicle is located may be calculated. A calculation method may be the following formula (3):

$$\gamma_{v1} = \frac{|x_{v1} - x_{c1}|}{|x_{r1} - x_{l1}|} \tag{3}$$

A distance relationship value between the vertex 2 and the center line of the lane in which the current vehicle is located may be calculated as follows:

First, a point $C_2$ that is on the center line of the lane and that corresponds to the vertex 2 is obtained, coordinates of $C_2$ are $(x_{c2}, y_{v2})$, and $x_{c2}$ may be calculated according to the following formula (4):

$$x_{c2} = \frac{x_{r2} + x_{l2}}{2} \tag{4}$$

Then, the distance relationship value between the vertex 2 and the center line of the lane in which the current vehicle is located may be calculated. A calculation method may be the following formula (5):

$$\gamma_{v2} = \frac{|x_{v2} - x_{c2}|}{|x_{r2} - x_{l2}|} \tag{5}$$

Finally, a smaller value between $\gamma_{v1}$ and $\gamma_{v2}$ is used as the second distance relationship value between the target vehicle and the center line of the lane in which the current vehicle is located.

Step 205: Calculate first confidence of a plurality of obtained first distance relationship values and second confidence of a plurality of obtained second distance relationship values.

In implementation, when the plurality of first distance relationship values and the plurality of second distance relationship values are obtained, the first confidence of the first distance relationship values and the second confidence of the second distance relationship values may be calculated. When the first distance relationship values and the second distance relationship values are obtained based on same detection periods, the confidence of the first distance relationship values and the confidence of the second distance relationship values may be calculated after M detection periods, and the confidence of the first distance relationship values and the confidence of the second distance relationship values may be recalculated in each subsequent detection period. M is a preset positive integer, and may be set according to an actual requirement, for example, may be set to 10, 15, or the like.

When the first confidence of the plurality of obtained first distance relationship values and the second confidence of the plurality of obtained second distance relationship values are calculated, an ideal lane change model and an ideal lane keep model may be used for calculation. The ideal lane change model is used to represent a time-varying relationship of a distance relationship value between another vehicle in the scene around the current vehicle and the center line of the lane in which the current vehicle is located when the another vehicle changes a lane. The ideal lane keep model is used to represent a time-varying relationship of a distance relationship value between the another vehicle and the center line of the lane in which the current vehicle is located when the another vehicle moves along the lane. The following describes a method for calculating, based on the ideal lane change model and the ideal lane keep model, the first confidence of the plurality of obtained first distance relationship values and the second confidence of the plurality of obtained second distance relationship values.

First, a first available lane change model and a first available lane keep model are obtained based on the plurality of obtained first distance relationship values, the ideal lane change model, and the ideal lane keep model. A second available lane change model and a second available lane keep model are obtained based on the plurality of obtained second distance relationship values, the ideal lane change model, and the ideal lane keep model.

It should be noted that the plurality of obtained first distance relationship values and the plurality of obtained second distance relationship values may be first distance relationship values and second distance relationship values obtained in a first preset quantity of consecutive detection periods including a current detection period. The first preset quantity may be set according to an actual requirement. For example, the first preset quantity may be the same as a value of M, and is set to 10, 15, or the like.

A method for obtaining the second available lane change model is the same as a method for obtaining the first available lane change model, and a method for obtaining the second available lane keep model is the same as a method for obtaining the first available lane keep model. The following uses the method for obtaining the first available lane change model and the method for obtaining the first available lane keep model as examples for description.

The ideal lane change model may be represented by the following relational expression (6):

$$q_{LC}(x_i) = \alpha_1\left(1 - \frac{1}{1 + e^{-\alpha_2 x_i + \alpha_3}}\right) \quad (6)$$

$q_{LC}(x_i)$ is a predicted distance relationship value. $\alpha_1$, $\alpha_2$ and $\alpha_3$ are to-be-determined unknown parameters.

The ideal lane keep model may be represented by the following relational expression (7):

$$q_{LK}(x_i)=\alpha_4 \quad (7)$$

$\alpha_4$ is a to-be-determined unknown parameter, and $q_{LK}(x_i)$ is a predicted distance relationship value.

For a method for calculating the to-be-determined unknown parameters $\alpha_1$, $\alpha_2$ and $\alpha_3$ in the ideal lane change model based on the plurality of obtained first distance relationship values, the calculation method may be the following formula (8):

$$(\alpha_1, \alpha_2, \alpha_3) = \text{argmin} f(\alpha_1, \alpha_2, \alpha_3) := \sum_{i=1}^{N} p(x_i) \cdot (\log p(x_i) - \log q_{LC}(x_i)) \quad (8)$$

N is a quantity of obtained first distance relationship values, and $x_i$ may be a sorting value corresponding to the $i^{th}$ obtained first distance relationship value in the plurality of obtained first distance relationship values. For example, $x_i$ is a sorting value corresponding to the first obtained first distance relationship value in the plurality of obtained first distance relationship values, $x_1=1$, and so on. $p(x_i)$ is the $i^{th}$ obtained first distance relationship value in the plurality of obtained first distance relationship values. The plurality of obtained first distance relationship values used to determine the to-be-determined unknown parameters in the ideal lane change model and sorting values respectively corresponding to the plurality of obtained first distance relationship values are substituted into the foregoing formula (8), and values of the unknown parameters $\alpha_1$, $\alpha_2$, and $\alpha_3$ are adjusted. When an accumulation result of the foregoing formula (8) is the smallest, values of $\alpha_1$, $\alpha_2$, and $\alpha_3$ are obtained, for example, $\alpha_1=\alpha_1$, $\alpha_2=\alpha_2$, and $\alpha_3=\alpha_3$, and $\alpha_1$, $\alpha_2$, and $\alpha_3$ are substituted into the foregoing formula (6), to obtain the first available lane change model, as shown in the following formula (9):

$$q_{LC1}(x_i) = a_1\left(1 - \frac{1}{1 + e^{-a_2 x_i + a_3}}\right) \quad (9)$$

For a method for determining the to-be-determined unknown parameter $\alpha_4$ in the ideal lane keep model based on the plurality of first distance relationship values, the method may be the following formula (10):

$$\alpha_4 = \text{argmin} f(\alpha_4) := \sum_{i=1}^{N} p(x_i) \cdot (\log p(x_i) - \log q_{LK}(x_i)) \quad (10)$$

The plurality of obtained first distance relationship values and the sorting values respectively corresponding to the plurality of first distance relationship values are substituted into the foregoing formula (10), and a value of the unknown parameter $\alpha_4$ is adjusted. When an accumulation result of the foregoing formula (10) is the smallest, a value of $\alpha_4$ is obtained, for example, $\alpha_4=\alpha_4$. The value of $\alpha_4$ is substituted into the foregoing formula (7), to obtain the first available lane keep model, as shown in the following formula (11):

$$q_{LK1}(x_i)=\alpha_4 \quad (11)$$

Similarly, the second available lane change model and the second available lane keep model are obtained based on the plurality of obtained second distance relationship values, the ideal lane change model, and the ideal lane keep model. The second available lane change model may be obtained according to the following formula (12):

$$q_{LC2}(x_i) = b_1\left(1 - \frac{1}{1 + e^{-b_2 x_i + b_3}}\right) \tag{12}$$

The second available lane keep model may be obtained according to the following formula (13):

$$q_{LK2}(x_i) = b_4 \tag{13}$$

Then, after the first available lane change model, the first lane keep model, the second available lane change model, and the second lane keep model are obtained, a first fitting degree of the plurality of obtained first distance relationship values to the first available lane change model and a second fitting degree of the plurality of obtained first distance relationship values to the first lane keep model may be separately calculated, and a third fitting degree of the plurality of obtained second distance relationship values to the second available lane change model and a fourth fitting degree of the plurality of obtained second distance relationship values to the second lane keep model may be calculated.

The first fitting degree of the plurality of obtained first distance relationship values to the first available lane change model may be calculated by using the following formula (14):

$$D_{LC1} = \sum_{i=1}^{N} p(x_i)\cdot(\log p(x_i) - \log q_{LC1}(x_i)) \tag{14}$$

The second fitting degree of the plurality of obtained first distance relationship values to the first available lane keep model may be calculated by using the following formula (15):

$$D_{LK1} = \sum_{i=1}^{N} p(x_i)\cdot(\log p(x_i) - \log q_{LK1}(x_i)) \tag{15}$$

The third fitting degree of the plurality of obtained second distance relationship values to the second available lane change model may be calculated by using the following formula (16):

$$D_{LC2} = \sum_{i=1}^{N} p(x_i)\cdot(\log p(x_i) - \log q_{LC2}(x_i)) \tag{16}$$

The fourth fitting degree of the plurality of obtained second distance relationship values to the second available lane keep model may be calculated by using the following formula (17):

$$D_{LK2} = \sum_{i=1}^{N} p(x_i)\cdot(\log p(x_i) - \log q_{LK2}(x_i)) \tag{17}$$

Finally, a reciprocal of a smaller value between the first fitting degree and the second fitting degree is calculated, and is used as the first confidence $T_1$ of the obtained first distance relationship values. A reciprocal of a smaller value between the third fitting degree and the fourth fitting degree is calculated, and is used as the first confidence $T_2$ of the obtained second distance relationship values.

Step 206: Calculate, based on the first confidence and the second confidence, a plurality of fusion distance relationship values of the plurality of first distance relationship values and the plurality of second distance relationship values.

In implementation, for the plurality of obtained first distance relationship values and the plurality of obtained second distance relationship values, a target first distance relationship value and a target second distance relationship value that are obtained in a same detection period may be obtained. A product of the target first distance relationship value and a first weight is added to a product of the target second distance relationship value and a second weight, to obtain a fusion distance relationship value corresponding to the detection period to which the target first distance relationship value and the target second relationship value belong. In this way, corresponding fusion distance values may be obtained for detection periods to which the plurality of obtained first distance relationship values and the plurality of obtained second distance relationship values belong.

The first weights $W_1$ corresponding to the plurality of obtained first distance relationship values may be calculated according to the following formula (18):

$$W_1 = \frac{T_1}{T_1 + T_2} \tag{18}$$

The second weights $W_2$ corresponding to the plurality of obtained second distance relationship values may be calculated according to the following formula (19):

$$W_2 = \frac{T_2}{T_1 + T_2} \tag{19}$$

Then, a target first distance relationship value and a target second distance relationship value that are obtained in a same detection period are sequentially obtained from the plurality of obtained first distance relationship values and the plurality of obtained second distance relationship values. A product of a target first distance relationship value $\gamma_{li}$ obtained in the $i^{th}$ detection period and a first weight $W_1$ is added to a product of a target second distance relationship value $\gamma_{vi}$ obtained in the $i^{th}$ detection period and a second weight $W_2$, to obtain a fusion distance relationship value $\gamma_{fi}$ corresponding to the $i^{th}$ detection period, where i is a detection period to which the currently obtained target first distance relationship value and the target second distance relationship value belong; and $\gamma_{fi}$ is a sorting value in each of the plurality of detection periods to which the plurality of obtained first distance relationship values and the plurality of obtained second distance relationship values belong.

A calculation formula may be the following formula (20):

$$\gamma_{fi} = W_1\gamma_{li} + W_2\gamma_{vi} \tag{20}$$

Step 207: Determine, based on the plurality of fusion distance relationship values, whether the target vehicle has a lane change trend.

In implementation, the fusion distance relationship value corresponding to each of the plurality of detection periods and the corresponding sorting value are substituted into the foregoing formula (8). A sorting value corresponding to the fusion distance value may be represented by a sorting value of a detection period in which the fusion distance value is obtained through calculation in the plurality of detection periods. The sorting value corresponding to the fusion distance value is substituted into $x_i$ in the foregoing formula (8), and the fusion distance relationship value is substituted into $p(x_i)$ in the foregoing formula (8). Values of the unknown parameters $\alpha_1$, $\alpha_2$, and $\alpha_3$ are adjusted. When an accumulation result of the foregoing formula (8) is the smallest, values of $\alpha_1$, $\alpha_2$, and $\alpha_3$ are obtained, for example, $\alpha_1=b_1$, $\alpha_2=b_2$, and $\alpha_3=b_3$. The values of $\alpha_1$, $\alpha_2$, and $\alpha_3$ are substituted into the foregoing formula (6), to obtain a third available lane change model, as shown in the following formula (21):

$$q_{LC3}(x_i) = b_1\left(1 - \frac{1}{1 + e^{-b_2 x_i + b_3}}\right) \tag{21}$$

Then, a fitting degree of the fusion distance relationship values corresponding to the plurality of detection periods to the third available lane change model may be calculated. A calculation method may be the following formula (22). The sorting value corresponding to the fusion distance value is substituted into $x_i$ in the formula (22), and the fusion distance relationship value is substituted into $p(x_i)$ in the formula (22).

$$D_{LC3} = \sum_{i=1}^{N} p(x_i) \cdot (\log p(x_i) - \log q_{LC3}(x_i)) \tag{22}$$

N is a quantity of fusion distance values used to determine whether the target vehicle has a lane change trend.

Finally, it is determined whether the calculated fitting degree $D_{LC3}$ is greater than the preset fitting degree. If the calculated fitting degree $D_{LC3}$ is greater than the preset fitting degree, it may be determined that the target vehicle has the lane change trend.

In this embodiment of this application, the lane change trend of the target vehicle is comprehensively determined with reference to the laser point cloud data obtained by using the laser radar technology and the scene image obtained by using the machine vision technology. This can effectively avoid a problem of inaccurate recognition of the vehicle lane change trend that is caused by using only the laser radar technology or the machine vision technology.

Figure 5:
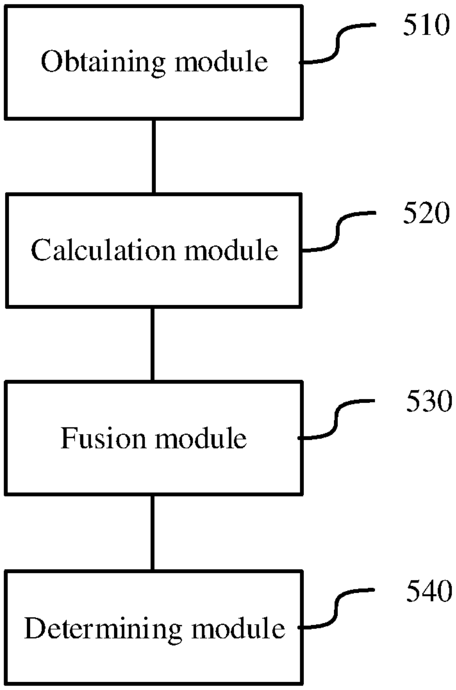
FIG. 5 is a schematic diagram of a structure of an apparatus for recognizing a vehicle lane change trend according to an embodiment of this application.

Based on a same technical concept, an embodiment of this application further provides an apparatus for recognizing a vehicle lane change trend, and the apparatus may be applied to a device for recognizing a vehicle lane change trend. As shown in FIG. 5, the apparatus for recognizing the vehicle lane change trend includes the following modules.

An obtaining module 510 is configured to: obtain laser point cloud data of a detected target vehicle, where the target vehicle is a vehicle traveling in a scene around the current vehicle; obtain, based on the laser point cloud data, a first distance relationship value between a center line of a lane in which the current vehicle is located and the target vehicle; obtain a scene image including the target vehicle; and obtain, based on the scene image, a second distance relationship value between the center line of the lane in which the current vehicle is located and the target vehicle. In some embodiments, the obtaining function in the foregoing steps 201 to 204 and other implicit steps may be implemented.

A calculation module 520 is configured to calculate first confidence of a plurality of obtained first distance relationship values and second confidence of a plurality of obtained second distance relationship values. In some embodiments, a calculation function in step 205 and other implicit steps may be implemented.

A fusion module 530 is configured to calculate a plurality of fusion distance relationship values of the plurality of first distance relationship values and the plurality of second distance relationship values based on the first confidence and the second confidence. In some embodiments, a fusion function in step 206 and other implicit steps may be implemented.

A determining module 540 is configured to determine, based on the plurality of fusion distance relationship values, whether the target vehicle has a lane change trend. In some embodiments, a determining function in step 207 and other implicit steps may be implemented.

In a possible implementation, the obtaining module 510 is configured to:

obtain, based on a high-definition map, a center line point set of the lane in which the current vehicle is located, where the center line point set includes coordinates of a plurality of sampling points on the center line of the lane in which the current vehicle is located in a world coordinate system; and obtain, based on the laser point cloud data and the center line point set, the first distance relationship value between the center line of the lane in which the current vehicle is located and the target vehicle.

In a possible implementation, the obtaining module 510 is configured to:

obtain, based on the laser point cloud data, first coordinates of the target vehicle in a self-vehicle coordinate system of the current vehicle;

convert the first coordinates into second coordinates of the target vehicle in the world coordinate system;

use a minimum distance between the coordinates of the sampling points included in the center line point set in the world coordinate system and the second coordinate as a first distance between the center line of the lane in which the current vehicle is located and the target vehicle; and obtain a width of the lane in which the current vehicle is located, calculate a first ratio of the first distance to the width of the lane line in which the current vehicle is located, and use the first ratio as the first distance relationship value between the center line of the lane in which the current vehicle is located and the target vehicle.

In a possible implementation, the obtaining module 510 is configured to:

calculate, in an image coordinate system of the scene image, a vertical distance between the target vehicle and the center line of the lane in which the current vehicle is located;

calculate a width of the lane in which the current vehicle is located in the image coordinate system of the scene image; and calculate a second ratio of the vertical distance to the width of the lane in which the current vehicle is located in the image coordinate system of the scene image, and use the second ratio as the second distance relationship value between the center line of the lane in which the current vehicle is located and the target vehicle.

In a possible implementation, the calculation module 520 is configured to:

calculate, based on an ideal lane change model and an ideal lane keep model, the first confidence of the plurality of obtained first distance relationship values and the second confidence of the plurality of obtained second distance relationship values, where the ideal lane change model is used to represent a time-varying relationship of a distance relationship value between another vehicle in the scene around the current vehicle and the center line of the lane in which the current vehicle is located when the another vehicle changes a lane; and the ideal lane keep model is used to represent a time-varying relationship of a distance relationship value between the another vehicle and the center line of the lane in which the current vehicle is located when the another vehicle moves along the lane.

In a possible implementation, the calculation module 520 is configured to:

calculate a value of each unknown parameter in the ideal lane change model based on the plurality of obtained first distance relationship values, to obtain a first available lane change model;

calculate a value of each unknown parameter in the ideal lane keep model based on the plurality of obtained first distance relationship values, to obtain a first available lane keep model;

calculate a first fitting degree of the plurality of obtained first distance relationship values to the first available lane change model and a second fitting degree of the plurality of obtained first distance relationship values to the first available lane keep model;

obtain the first confidence of the plurality of obtained first distance relationship values based on the first fitting degree and the second fitting degree;

calculate a value of each unknown parameter in the ideal lane change model based on the plurality of obtained second distance relationship values, to obtain a second available lane change model;

calculate a value of each unknown parameter in the ideal lane keep model based on the plurality of obtained second distance relationship values, to obtain a second available lane keep model;

calculate a third fitting degree of the plurality of obtained second distance relationship values to the second available lane change model and a fourth fitting degree of the plurality of obtained second distance relationship values to the second available lane keep model; and obtain the second confidence of the plurality of obtained second distance relationship values based on the third fitting degree and the fourth fitting degree.

In a possible implementation, the calculation module 520 is configured to:

determine a reciprocal of a smaller value between the first fitting degree and the second fitting degree as the first confidence of the plurality of obtained first distance relationship values.

Obtaining the second confidence of the plurality of obtained second distance relationship values based on the third fitting degree and the fourth fitting degree includes:

determining a reciprocal of a smaller value between the third fitting degree and the fourth fitting degree as the second confidence of the plurality of obtained second distance relationship values.

In a possible implementation, the obtaining module 510 is configured to:

obtain, based on a detection period and the laser point cloud data, the first distance relationship value between the center line of the lane in which the current vehicle is located and the target vehicle; and obtain, based on the detection period and the scene image, the second distance relationship value between the center line of the lane in which the current vehicle is located and the target vehicle.

The fusion module 530 is configured to:

calculate, based on the first confidence and the second confidence, the first weight corresponding to the plurality of first distance relationship values and the second weight corresponding to the plurality of second distance relationship values;

obtain, from the plurality of first distance relationship values and the plurality of second distance relationship values, a target first distance relationship value and a target second distance relationship value that are obtained in a same detection period; and add a product of the target first distance relationship value and the first weight to a product of the target second distance relationship value and the second weight, to obtain a fusion distance relationship value corresponding to the detection period to which the target first distance relationship value and the target second relationship value belong.

In a possible implementation, the determining module 540 is configured to:

calculate a value of each unknown parameter in the ideal lane change model based on a fusion distance relationship value corresponding to each of the plurality of detection periods, to obtain a third available lane change model;

calculate a fifth fitting degree of the fusion distance relationship values corresponding to the plurality of detection periods to the third available lane change model; and if the fifth fitting degree is greater than a preset fitting degree threshold, determine that the target vehicle has a lane change trend.

It should be noted that, when the apparatus for recognizing the vehicle lane change trend provided in the foregoing embodiment recognizes the vehicle lane change trend, division of the foregoing functional modules is merely used as an example for description. In actual application, the foregoing functions may be allocated to different functional modules and implemented according to a requirement. In other words, an internal structure of the device for recognizing the vehicle lane change trend may be divided into different functional modules to implement all or some of the functions described above. In addition, the apparatus for recognizing a vehicle lane change trend provided in the foregoing embodiment and the method embodiment for recognizing a vehicle lane change trend belong to a same concept. For a specific implementation process, refer to the method embodiment. Details are not described herein again.

In the foregoing embodiment, all or part of the software, hardware, firmware, or any combination thereof may be implemented. When the software is used for implementation, all or part of the implementation may be implemented in a form of a computer program product. The computer program product includes one or more computer instructions. When the computer program instructions are loaded and executed on a device, the procedures or functions are all or partially generated according to embodiments of this application. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer-readable storage medium may be any usable medium accessible by a device, or a data storage device, such as a server or a data center, integrating one or more usable media. The usable media may be a magnetic medium (for example, a floppy disk, a hard disk drive, a magnetic tape, or the like), an optical medium (for example, a digital video disk (DVD), or the like), a semiconductor medium (for example, a solid-state drive, or the like).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the spirit and principle of this application should fall within the protection scope of this application.

What is claimed is:

1. A method for recognizing a vehicle lane change trend, the method comprising:
   - obtaining laser point cloud data of a detected target vehicle, wherein the target vehicle is a vehicle traveling in a scene around a current vehicle;
   - obtaining, based on the laser point cloud data, a first distance relationship value between a center line of a lane in which the current vehicle is located and the target vehicle;
   - obtaining a scene image comprising the target vehicle;
   - obtaining, based on the scene image, a second distance relationship value between the center line of the lane in which the current vehicle is located and the target vehicle;
   - calculating, based on an ideal lane change model and an ideal lane keep model, first confidence of a plurality of first distance relationship values obtained based on laser point cloud data for a predetermined number of periods, wherein the ideal lane change model represents a time-varying relationship of a distance relationship value between another vehicle in the scene around the current vehicle and the center line of the lane in which the current vehicle is located when the another vehicle changes a lane, and the ideal lane keep model represents a time-varying relationship of a distance relationship value between another vehicle and the center line of the lane in which the current vehicle is located when the another vehicle moves along the lane;
   - calculating, based on the ideal lane change model and the ideal lane keep model, second confidence of a plurality of second distance relationship values obtained based on scene images for the predetermined number of periods;
   - calculating a plurality of fusion distance relationship values of the plurality of first distance relationship values and the plurality of second distance relationship values based on the first confidence and the second confidence; and
   - determining, based on the plurality of fusion distance relationship values, whether the target vehicle has a lane change trend,
   - wherein calculating, based on the ideal lane change model and the ideal lane keep model, the first confidence of the plurality of first distance relationship values comprises:
     - calculating a value of each unknown parameter in the ideal lane change model based on the plurality of first distance relationship values to obtain a first available lane change model;
     - calculating a value of each unknown parameter in the ideal lane keep model based on the plurality of first distance relationship values to obtain a first available lane keep model;
     - calculating a first fitting degree of the plurality of first distance relationship values to the first available lane change model and a second fitting degree of the plurality of first distance relationship values to the first available lane keep model;
     - determining a reciprocal of a smaller value between the first fitting degree and the second fitting degree as the first confidence of the plurality of first distance relationship values;
   - wherein calculating, based on the ideal lane change model and the ideal lane keep model, the second confidence of the plurality of second distance relationship values comprises:
     - calculating a value of each unknown parameter in the ideal lane change model based on the plurality of second distance relationship values to obtain a second available lane change model;
     - calculating a value of each unknown parameter in the ideal lane keep model based on the plurality of second distance relationship values to obtain a second available lane keep model;
     - calculating a third fitting degree of the plurality of second distance relationship values to the second available lane change model and a fourth fitting degree of the plurality of second distance relationship values to the second available lane keep model; and
     - determining a reciprocal of a smaller value between the third fitting degree and the fourth fitting degree as the second confidence of the plurality of second distance relationship values.

2. The method according to claim 1, wherein the obtaining, based on the laser point cloud data, a first distance relationship value between a center line of a lane in which the current vehicle is located and the target vehicle comprises:
   - obtaining, based on a high-definition map, a center line point set of the lane in which the current vehicle is located, wherein the center line point set comprises coordinates of a plurality of sampling points on the center line of the lane in which the current vehicle is located in a world coordinate system; and
   - obtaining, based on the laser point cloud data and the center line point set, the first distance relationship value between the center line of the lane in which the current vehicle is located and the target vehicle.

3. The method according to claim 2, wherein the obtaining, based on the laser point cloud data and the center line point set, the first distance relationship value between the center line of the lane in which the current vehicle is located and the target vehicle comprises:

obtaining, based on the laser point cloud data, first coordinates of the target vehicle in a self-vehicle coordinate system of the current vehicle;

converting the first coordinates into second coordinates of the target vehicle in the world coordinate system;

determining a first distance between the center line of the lane in which the current vehicle is located and the target vehicle as a minimum distance between the coordinates of the sampling points comprised in the center line point set in the world coordinate system and the second coordinates;

obtaining a width of the lane in which the current vehicle is located;

calculating a first ratio of the first distance to the width of the lane in which the current vehicle is located; and determining, as the first ratio, the first distance relationship value between the center line of the lane in which the current vehicle is located and the target vehicle.

4. The method according to claim 1, wherein the obtaining, based on the scene image, a second distance relationship value between the center line of the lane in which the current vehicle is located and the target vehicle comprises:

calculating, in an image coordinate system of the scene image, a vertical distance between the target vehicle and the center line of the lane in which the current vehicle is located, wherein the vertical distance is determined based on a difference between a vertical coordinate of the target vehicle and a vertical coordinate of the center line of the lane in which the current vehicle is located;

calculating a width of the lane in which the current vehicle is located in the image coordinate system of the scene image;

calculating a second ratio of the width of the lane in which the current vehicle is located in the image coordinate system to the vertical distance; and determining the second distance relationship value as the second ratio.

5. The method according to claim 1, wherein the ideal lane change model is determined based on:

$$q_{LC}(x_i) = \alpha_1\left(1 - \frac{1}{1 + e^{-\alpha_2 \cdot x_i + \alpha_3}}\right),$$

wherein $\alpha_1$, $\alpha_2$, and $\alpha_3$ are the unknown parameters in the ideal lane change model, and $q_{LC}(x_i)$ is a predicted distance relationship value, and $x_i$ is a sorting value corresponding to an i-th obtained distance relationship value in the plurality of first distance relationship values; and wherein the ideal lane keep model is determined based on:

$$q_{LK}(x_i)=\alpha_4,$$

wherein $\alpha_4$ is the unknown parameter in the ideal lane keep model, and $g_{LK}(x_i)$ is a predicted distance relationship value.

6. The method according to claim 1, wherein:

the obtaining, based on the laser point cloud data, a first distance relationship value between a center line of a lane in which the current vehicle is located and the target vehicle comprises:

obtaining, based on a detection period and the laser point cloud data, the first distance relationship value between the center line of the lane in which the current vehicle is located and the target vehicle;

the obtaining, based on the scene image, a second distance relationship value between the center line of the lane in which the current vehicle is located and the target vehicle comprises:

obtaining, based on the detection period and the scene image, the second distance relationship value between the center line of the lane in which the current vehicle is located and the target vehicle; and the calculating a plurality of fusion distance relationship values of the plurality of first distance relationship values and the plurality of second distance relationship values based on the first confidence and the second confidence comprises:

calculating, based on the first confidence and the second confidence, a first weight corresponding to the plurality of first distance relationship values and a second weight corresponding to the plurality of second distance relationship values;

obtaining, from the plurality of first distance relationship values and the plurality of second distance relationship values, a target first distance relationship value and a target second distance relationship value that are obtained in a same detection period; and adding a product of the target first distance relationship value and the first weight to a product of the target second distance relationship value and the second weight to obtain a fusion distance relationship value corresponding to the detection period to which the target first distance relationship value and the target second distance relationship value belong.

7. The method according to claim 6, wherein the determining, based on the plurality of fusion distance relationship values, whether the target vehicle has a lane change trend comprises:

calculating a value of each unknown parameter in the ideal lane change model based on the plurality of fusion distance relationship values to obtain a third available lane change model;

calculating a fifth fitting degree of the plurality of fusion distance relationship values to the third available lane change model; and in response to determining that the fifth fitting degree is greater than a preset fitting degree threshold, determining that the target vehicle has a lane change trend.

8. An apparatus for recognizing a vehicle lane change trend, wherein the apparatus comprises:

at least one processor; and one or more memories coupled to the at least one processor and storing programming instructions for execution by the at least one processor to perform operations comprising:

obtaining laser point cloud data of a detected target vehicle, wherein the target vehicle is a vehicle traveling in a scene around a current vehicle;

obtaining, based on the laser point cloud data, a first distance relationship value between a center line of a lane in which the current vehicle is located and the target vehicle;

obtaining a scene image comprising the target vehicle;

obtaining, based on the scene image, a second distance relationship value between the center line of the lane in which the current vehicle is located and the target vehicle;

calculating, based on an ideal lane change model and an ideal lane keep model, first confidence of a plurality of first distance relationship values obtained based on laser point cloud data for a predetermined number of periods, wherein the ideal lane change model represents a time-varying relationship of a distance relationship value between another vehicle in the scene around the current vehicle and the center line of the lane in which the current vehicle is located when the another vehicle changes a lane, and the ideal lane keep model represents a time-varying relationship of a distance relationship value between another vehicle and the center line of the lane in which the current vehicle is located when the another vehicle moves along the lane;

calculating, based on the ideal lane change model and the ideal lane keep model, second confidence of a plurality of second distance relationship values obtained based on scene images for the predetermined number of periods;

calculating a plurality of fusion distance relationship values of the plurality of first distance relationship values and the plurality of second distance relationship values based on the first confidence and the second confidence; and determining, based on the plurality of fusion distance relationship values, whether the target vehicle has a lane change trend, wherein the operations further comprise:

calculating a value of each unknown parameter in the ideal lane change model based on the plurality of first distance relationship values to obtain a first available lane change model;

calculating a value of each unknown parameter in the ideal lane keep model based on the plurality of first distance relationship values to obtain a first available lane keep model;

calculating a first fitting degree of the plurality of first distance relationship values to the first available lane change model and a second fitting degree of the plurality of first distance relationship values to the first available lane keep model;

determining a reciprocal of a smaller value between the first fitting degree and the second fitting degree as the first confidence of the plurality of first distance relationship values;

calculating a value of each unknown parameter in the ideal lane change model based on the plurality of second distance relationship values to obtain a second available lane change model;

calculating a value of each unknown parameter in the ideal lane keep model based on the plurality of second distance relationship values to obtain a second available lane keep model;

calculating a third fitting degree of the plurality of second distance relationship values to the second available lane change model and a fourth fitting degree of the plurality of second distance relationship values to the second available lane keep model; and determining a reciprocal of a smaller value between the third fitting degree and the fourth fitting degree as the second confidence of the plurality of second distance relationship values.

9. The apparatus according to claim 8, wherein the programming instructions instruct the at least one processor to perform the following operations:

obtaining, based on a high-definition map, a center line point set of the lane in which the current vehicle is located, wherein the center line point set comprises coordinates of a plurality of sampling points on the center line of the lane in which the current vehicle is located in a world coordinate system; and obtaining, based on the laser point cloud data and the center line point set, the first distance relationship value between the center line of the lane in which the current vehicle is located and the target vehicle.

10. The apparatus according to claim 9, wherein the one or more memories store the programming instructions for execution by the at least one processor to perform the following operations:

obtaining, based on the laser point cloud data, first coordinates of the target vehicle in a self-vehicle coordinate system of the current vehicle;

converting the first coordinates into second coordinates of the target vehicle in the world coordinate system;

determining a first distance between the center line of the lane in which the current vehicle is located and the target vehicle as a minimum distance between the coordinates of the sampling points comprised in the center line point set in the world coordinate system and the second coordinates;

obtaining a width of the lane in which the current vehicle is located;

calculating a first ratio of the first distance to the width of the lane in which the current vehicle is located; and determining, as the first ratio, the first distance relationship value between the center line of the lane in which the current vehicle is located and the target vehicle.

11. The apparatus according to claim 8, wherein the one or more memories store the programming instructions for execution by the at least one processor to perform the following operations:

calculating, in an image coordinate system of the scene image, a vertical distance between the target vehicle and the center line of the lane in which the current vehicle is located, wherein the vertical distance is determined based on a difference between a vertical coordinate of the target vehicle and a vertical coordinate of the center line of the lane in which the current vehicle is located;

calculating a width of the lane in which the current vehicle is located in the image coordinate system of the scene image;

calculating a second ratio of the vertical distance to the width of the lane in which the current vehicle is located in the image coordinate system of the scene image; and determining the second distance relationship value as the second ratio.

12. The apparatus according to claim 8, wherein the ideal lane change model is determined based on:

$$q_{LC}(x_i) = \alpha_1\left(1 - \frac{1}{1 + e^{-\alpha_2 \cdot x_i + \alpha_3}}\right),$$

wherein $\alpha_1$, $\alpha_2$, and $\alpha_3$ are the unknown parameters in the ideal lane change model, and $q_{LC}(x_i)$ is a predicted distance relationship value, and $x_i$ is a sorting value corresponding to an i-th obtained distance relationship value in the plurality of first distance relationship values; and wherein the ideal lane keep model is determined based on:

$$q_{LK}(x_i)=\alpha_4,$$

wherein $\alpha_4$ is the unknown parameter in the ideal lane keep model, and $g_{LK}(x_i)$ is a predicted distance relationship value.

13. The apparatus according to claim 8, wherein the one or more memories store the programming instructions for execution by the at least one processor to perform the following operations:

obtaining, based on a detection period and the laser point cloud data, the first distance relationship value between the center line of the lane in which the current vehicle is located and the target vehicle; and obtaining, based on the detection period and the scene image, the second distance relationship value between the center line of the lane in which the current vehicle is located and the target vehicle; and calculating, based on the first confidence and the second confidence, a first weight corresponding to the plurality of first distance relationship values and a second weight corresponding to the plurality of second distance relationship values;

obtaining, from the plurality of first distance relationship values and the plurality of second distance relationship values, a target first distance relationship value and a target second distance relationship value that are obtained in a same detection period; and adding a product of the target first distance relationship value and the first weight to a product of the target second distance relationship value and the second weight to obtain a fusion distance relationship value corresponding to the detection period to which the target first distance relationship value and the target second distance relationship value belong.

14. The apparatus according to claim 13, wherein the one or more memories store the programming instructions for execution by the at least one processor to perform the following operations:

calculating a value of each unknown parameter in the ideal lane change model based on a fusion distance relationship value corresponding to each of a plurality of detection periods to obtain a third available lane change model;

calculating a fifth fitting degree of the fusion distance relationship values corresponding to the plurality of detection periods to the third available lane change model; and in response to determining that the fifth fitting degree is greater than a preset fitting degree threshold, determining that the target vehicle has a lane change trend.

15. A non-transitory computer-readable storage medium storing programming instructions for execution by at least one processor to perform operations comprising:

obtaining laser point cloud data of a detected target vehicle, wherein the target vehicle is a vehicle traveling in a scene around a current vehicle;

obtaining, based on the laser point cloud data, a first distance relationship value between a center line of a lane in which the current vehicle is located and the target vehicle;

obtaining a scene image comprising the target vehicle;

obtaining, based on the scene image, a second distance relationship value between the center line of the lane in which the current vehicle is located and the target vehicle;

calculating, based on an ideal lane change model and an ideal lane keep model, first confidence of a plurality of first distance relationship values obtained based on laser point cloud data for a predetermined number of periods, wherein the ideal lane change model represents a time-varying relationship of a distance relationship value between another vehicle in the scene around the current vehicle and the center line of the lane in which the current vehicle is located when the another vehicle changes a lane, and the ideal lane keep model represents a time-varying relationship of a distance relationship value between another vehicle and the center line of the lane in which the current vehicle is located when the another vehicle moves along the lane;

calculating, based on the ideal lane change model and the ideal lane keep model, second confidence of a plurality of second distance relationship values obtained based on scene images for the predetermined number of periods;

calculating a plurality of fusion distance relationship values of the plurality of first distance relationship values and the plurality of second distance relationship values based on the first confidence and the second confidence; and determining, based on the plurality of fusion distance relationship values, whether the target vehicle has a lane change trend, wherein the operations further comprise:

calculating a value of each unknown parameter in the ideal lane change model based on the plurality of first distance relationship values to obtain a first available lane change model;

calculating a value of each unknown parameter in the ideal lane keep model based on the plurality of first distance relationship values to obtain a first available lane keep model;

calculating a first fitting degree of the plurality of first distance relationship values to the first available lane change model and a second fitting degree of the plurality of first distance relationship values to the first available lane keep model;

determining a reciprocal of a smaller value between the first fitting degree and the second fitting degree as the first confidence of the plurality of first distance relationship values;

calculating a value of each unknown parameter in the ideal lane change model based on the plurality of second distance relationship values to obtain a second available lane change model;

calculating a value of each unknown parameter in the ideal lane keep model based on the plurality of second distance relationship values to obtain a second available lane keep model;

calculating a third fitting degree of the plurality of second distance relationship values to the second available lane change model and a fourth fitting degree of the plurality of second distance relationship values to the second available lane keep model; and determining a reciprocal of a smaller value between the third fitting degree and the fourth fitting degree as the second confidence of the plurality of second distance relationship values.

16. The non-transitory computer-readable storage medium according to claim 15, wherein the obtaining, based on the laser point cloud data, a first distance relationship value between a center line of a lane in which the current vehicle is located and the target vehicle comprises:

obtaining, based on a high-definition map, a center line point set of the lane in which the current vehicle is located, wherein the center line point set comprises coordinates of a plurality of sampling points on the center line of the lane in which the current vehicle is located in a world coordinate system; and obtaining, based on the laser point cloud data and the center line point set, the first distance relationship value between the center line of the lane in which the current vehicle is located and the target vehicle.

17. The non-transitory computer-readable storage medium according to claim 16, wherein the obtaining, based on the laser point cloud data and the center line point set, the first distance relationship value between the center line of the lane in which the current vehicle is located and the target vehicle comprises:

obtaining, based on the laser point cloud data, first coordinates of the target vehicle in a self-vehicle coordinate system of the current vehicle;

converting the first coordinates into second coordinates of the target vehicle in the world coordinate system;

determining a first distance between the center line of the lane in which the current vehicle is located and the target vehicle as a minimum distance between the coordinates of the sampling points comprised in the center line point set in the world coordinate system and the second coordinates;

obtaining a width of the lane in which the current vehicle is located;

calculating a first ratio of the first distance to the width of the lane in which the current vehicle is located; and determining, as the first ratio, the first distance relationship value between the center line of the lane in which the current vehicle is located and the target vehicle.

18. The non-transitory computer-readable storage medium according to claim 15, wherein the obtaining, based on the scene image, a second distance relationship value between the center line of the lane in which the current vehicle is located and the target vehicle comprises:

calculating, in an image coordinate system of the scene image, a vertical distance between the target vehicle and the center line of the lane in which the current vehicle is located, wherein the vertical distance is determined based on a difference between a vertical coordinate of the target vehicle and a vertical coordinate of the center line of the lane in which the current vehicle is located;

calculating a width of the lane in which the current vehicle is located in the image coordinate system of the scene image;

calculating a second ratio of the width of the lane in which the current vehicle is located in the image coordinate system to the vertical distance; and determining the second distance relationship value as the second ratio.

19. The non-transitory computer-readable storage medium according to claim 15, wherein the ideal lane change model is determined based on:

$$q_{LC}(x_i) = \alpha_1\left(1 - \frac{1}{1 + e^{-\alpha_2 \cdot x_i + \alpha_3}}\right),$$

wherein $\alpha_1$, $\alpha_2$, and $\alpha_3$ are the unknown parameters in the ideal lane change model, and $q_{LC}(x_i)$ is a predicted distance relationship value, and $x_i$ is a sorting value corresponding to an i-th obtained distance relationship value in the plurality of first distance relationship values; and wherein the ideal lane keep model is determined based on:

$$q_{LK}(x_i)=\alpha_4,$$

wherein $\alpha_4$ is the unknown parameter in the ideal lane keep model, and $g_{LK}(x_i)$ is a predicted distance relationship value.

20. The non-transitory computer-readable storage medium according to claim 15, wherein:

the obtaining, based on the laser point cloud data, a first distance relationship value between a center line of a lane in which the current vehicle is located and the target vehicle comprises:

obtaining, based on a detection period and the laser point cloud data, the first distance relationship value between the center line of the lane in which the current vehicle is located and the target vehicle;

the obtaining, based on the scene image, a second distance relationship value between the center line of the lane in which the current vehicle is located and the target vehicle comprises:

obtaining, based on the detection period and the scene image, the second distance relationship value between the center line of the lane in which the current vehicle is located and the target vehicle; and the calculating a plurality of fusion distance relationship values of the plurality of first distance relationship values and the plurality of second distance relationship values based on the first confidence and the second confidence comprises:

calculating, based on the first confidence and the second confidence, a first weight corresponding to the plurality of first distance relationship values and a second weight corresponding to the plurality of second distance relationship values;

obtaining, from the plurality of first distance relationship values and the plurality of second distance relationship values, a target first distance relationship value and a target second distance relationship value that are obtained in a same detection period; and adding a product of the target first distance relationship value and the first weight to a product of the target second distance relationship value and the second weight to obtain a fusion distance relationship value corresponding to the detection period to which the target first distance relationship value and the target second distance relationship value belong.

* * * * *